United States Patent [19]

Mitchell

[11] Patent Number: 5,118,233

[45] Date of Patent: Jun. 2, 1992

[54] PRE-SETTING AND CONTROLLING THE TIGHTENING OF STUD BOLTS AND THE LIKE AND NOVEL STUD BOLTS

[75] Inventor: Eugene R. Mitchell, Greenfield, N.H.

[73] Assignee: T. C. Bolt Corporation, Greenfield, N.H.

[21] Appl. No.: 493,905

[22] Filed: Mar. 15, 1990

[51] Int. Cl.$^5$ .............................................. F16B 31/02
[52] U.S. Cl. ............................................. 411/5; 411/2; 411/446
[58] Field of Search ................................. 411/3-5, 411/84, 112, 2, 402, 1-3; 29/446, 447, 452, 525.1

[56] References Cited

U.S. PATENT DOCUMENTS

| | | | |
|---|---|---|---|
| 2,380,379 | 7/1945 | Attwood | 411/112 X |
| 3,005,292 | 10/1961 | Reiland | 411/84 X |
| 3,245,142 | 4/1966 | Williams | 29/446 |
| 3,429,601 | 2/1969 | Bremers | 411/84 X |
| 3,444,775 | 5/1969 | Hius | 411/5 |
| 3,584,667 | 6/1971 | Reiland | 411/402 X |
| 3,668,754 | 6/1972 | Boast | 29/447 X |
| 3,763,725 | 10/1973 | Reiland | 411/2 X |
| 3,812,757 | 5/1974 | Reiland | 411/5 |
| 4,290,337 | 9/1981 | Kuwata et al. | 411/2 |
| 4,408,936 | 10/1983 | Williamson | 411/5 X |
| 4,450,616 | 5/1984 | Morita | 29/446 |
| 4,492,500 | 1/1985 | Ewing | 411/5 |
| 4,499,646 | 2/1985 | Allor et al. | 29/447 |
| 4,501,058 | 2/1985 | Schutzler | 29/447 X |
| 4,619,568 | 10/1986 | Carstensen | 29/447 X |
| 4,637,764 | 1/1987 | Imai | 411/5 |
| 4,659,267 | 4/1987 | Uno et al. | 411/5 |
| 4,708,554 | 11/1987 | Howard | 411/84 |
| 4,830,531 | 5/1989 | Condit et al. | 403/348 |
| 4,850,771 | 7/1989 | Hurd | 29/525.1 X |

FOREIGN PATENT DOCUMENTS

| | | | |
|---|---|---|---|
| 2353751 | 5/1975 | Fed. Rep. of Germany | 411/3 |
| 898026 | 6/1962 | United Kingdom | 411/3 |

OTHER PUBLICATIONS

Unistrut Bulletin.
TCB Catalog entitled "Features of High Strength T.C. Bolts".

Primary Examiner—Renee S. Luebke
Assistant Examiner—Jerry Redman
Attorney, Agent, or Firm—Rines, Rines, Shapiro & Shapiro

[57] ABSTRACT

Novel preset, calibrated stud bolts and spring-loaded nut assemblies with torque-off spline tips for securing structural conduit units and the like, and method of calibrating the same.

2 Claims, 7 Drawing Sheets

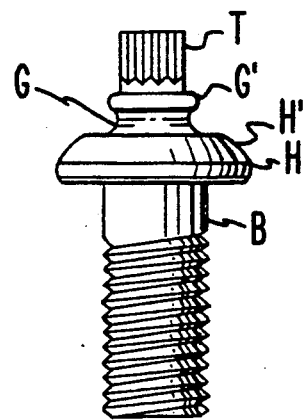
FIG. 1
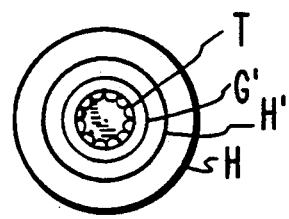
FIG. 2
FIG. 3
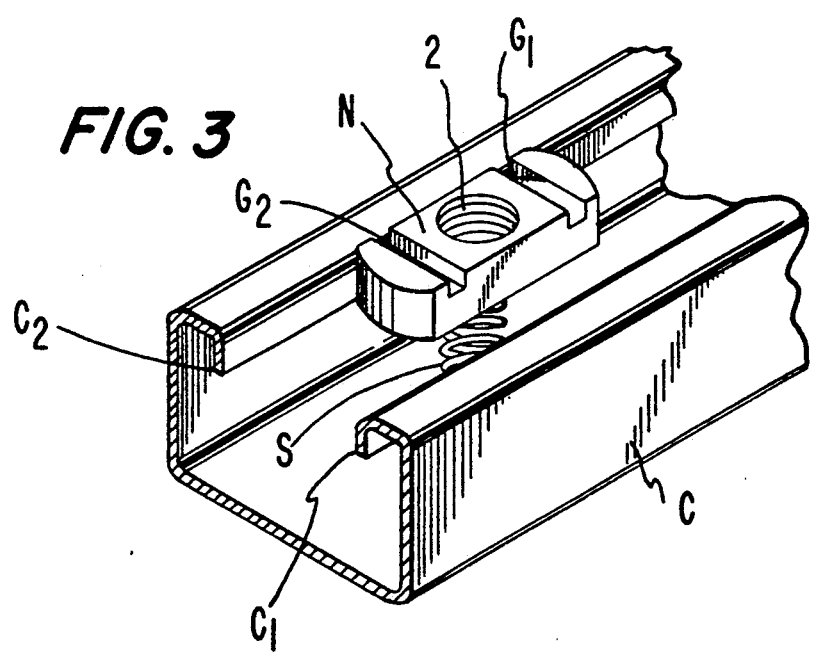

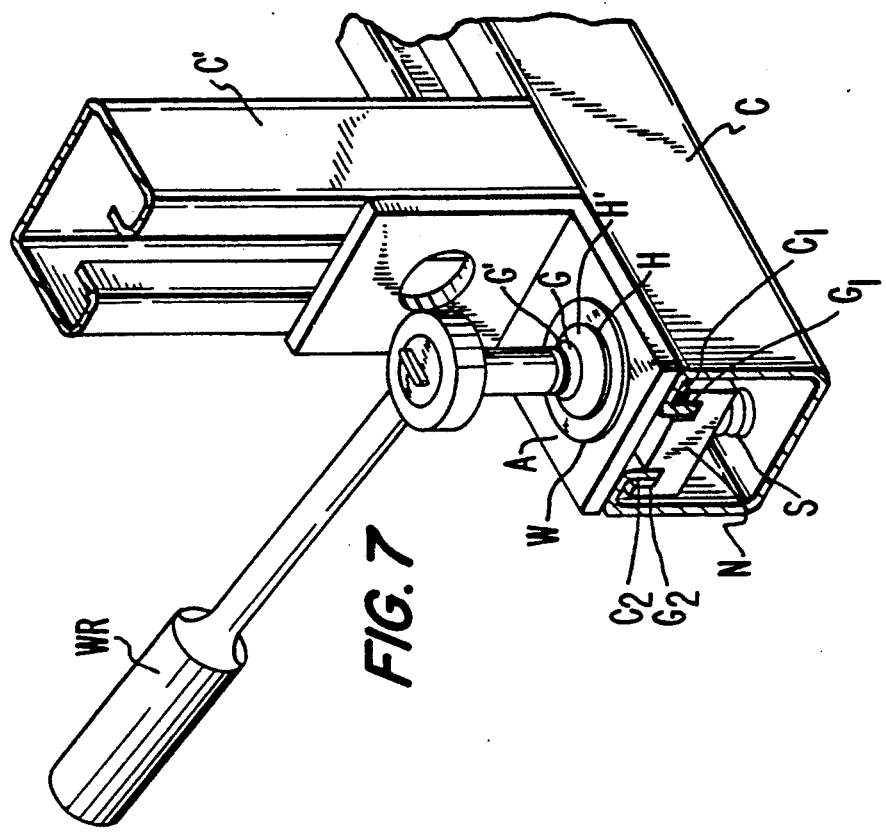
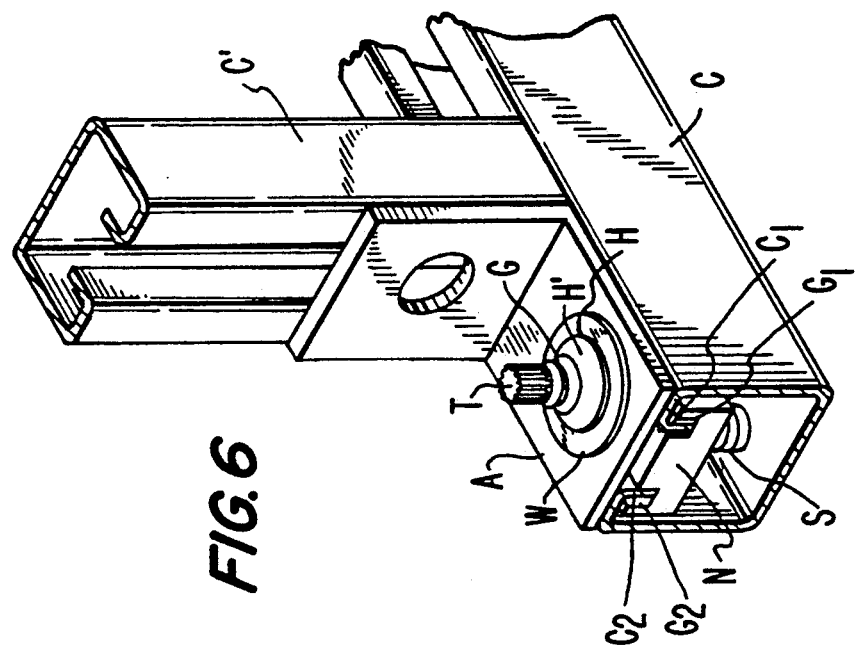

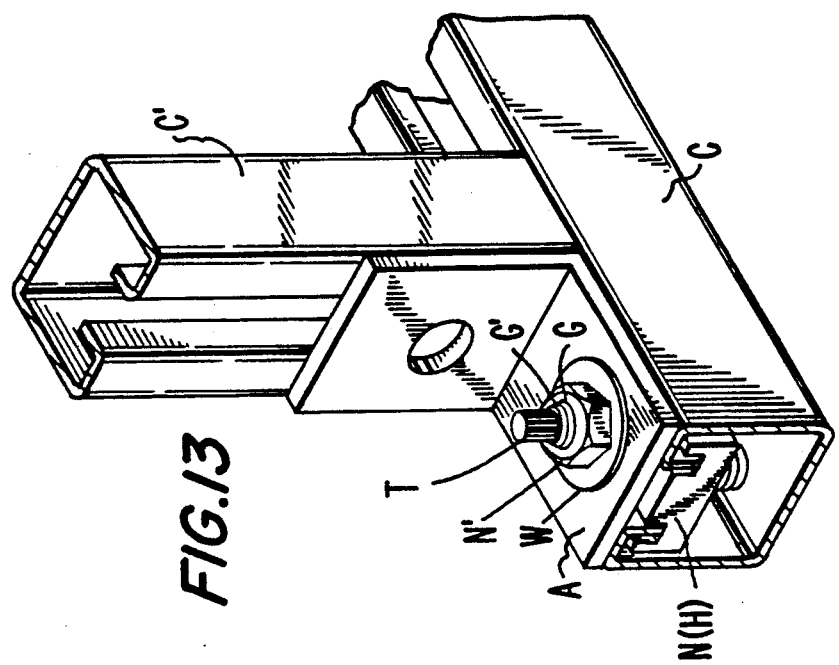
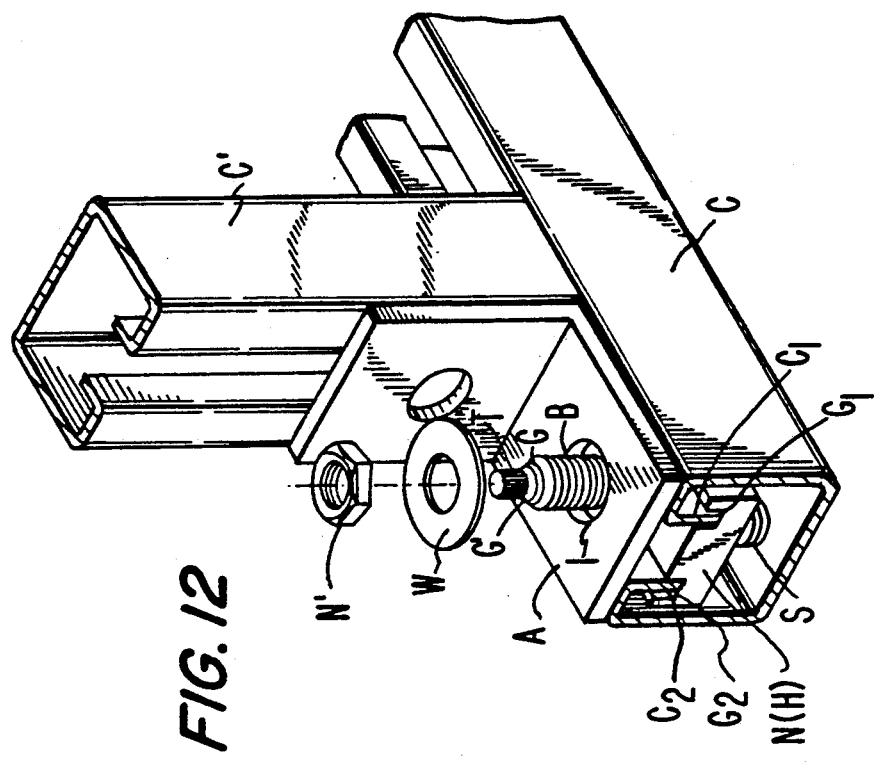

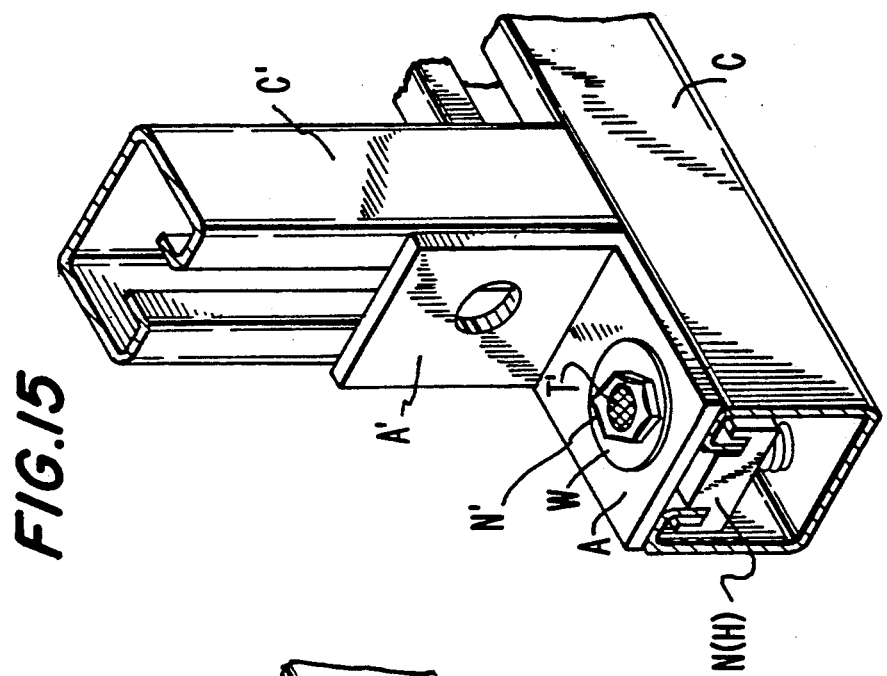
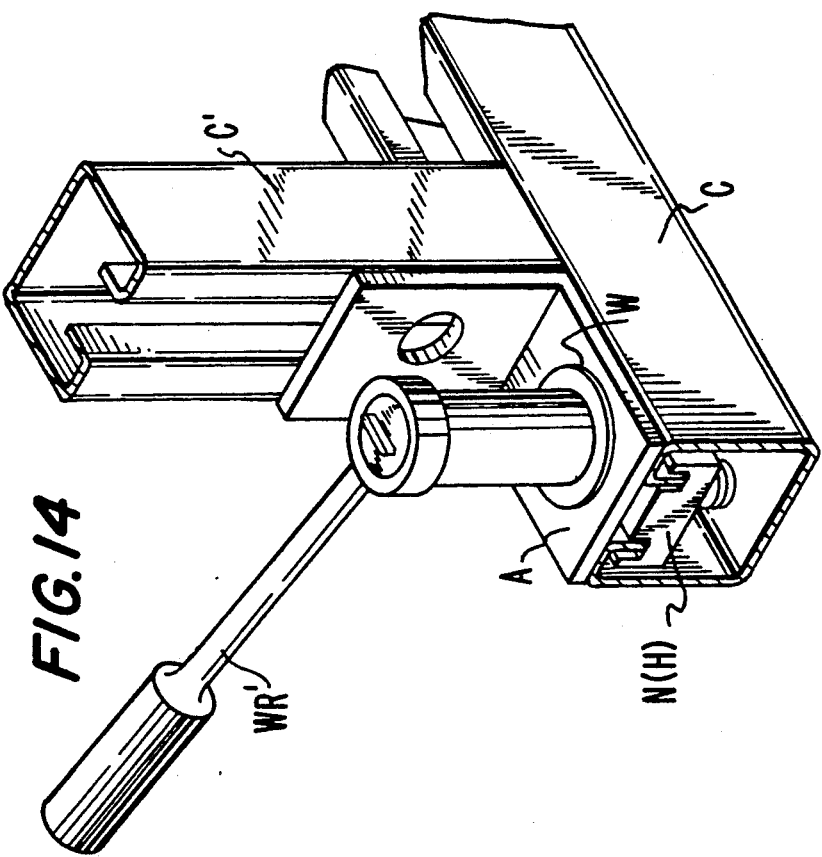

PRE-SETTING AND CONTROLLING THE TIGHTENING OF STUD BOLTS AND THE LIKE AND NOVEL STUD BOLTS

The present invention relates to stud bolts as for securing or assembling metal framing channels in right-angular and other configurations as for supporting electrical cable-carrying and distributing trays and other surfaces; being more particularly directed to novel concepts for presetting and controlling the degree of tightening or tension that may be applied to such stud bolts.

BACKGROUND

Such electrical cable trays are most useful in power plants and other buildings to organize the cables throughout the plant, and in other applications where overhead ceiling support of cables is required, or in building partitions, and for anchoring in brick faces of buildings and the like. The right-angular and other joining of open U-shaped channels for constructing the ladder-like or other skeletal support structure for such trays and the like is principally effected with aid of stud bolts generally having hexagonal ("hex") heads that enable the installer to tighten the same where, for example, right-angular position clamping plates are to secure right-angularly oriented channels together, as later more fully described in connection with the drawings of this application and in current bulletin sheets of Unistrut House of Bedford, England, entitled "Unistrut Building Systems" and "Metal Framing Structures".

In use, the installer manually tightens the hex head bolt that passes through the channel clamping plate into the spring-held nut inserted within the channel, and determines by "feel" and experience the proper tightness of the bolt. A major problem with such assembly techniques, however, resides in the fact that if the bolt is tightened too much, it can cause the edge lips of the channel, against which the nut bears, to collapse, such that the channel loses its structural integrity. If, on the other hand, the installer fails to tighten the bolt quite enough, the channel members being fastened together can slip or slide relative to one another, causing structural and safety problems.

While particularly in other applications, bolts with splined tips have been proposed to shear when a predetermined bolt tightening or tension is reached, such as, for example, of the type described in U.S. Pat. No. 3,812,757 and in the current catalogue of the assignee herein, entitled "TCB Features of High Strength TCB Bolts", for the purposes of the present invention, taking the responsibility of determining appropriate bolt tighteners totally out of the hands of the installer is most important; and concomitant with the same, techniques for reliably pre-setting and calibrating the precise degree of tightening inherently in the bolt structure, and parts location adapted to permit ready visual external inspection of proper tightening, and with a minimum number of parts in the bolt-nut assembly, are important.

OBJECT OF INVENTION

The primary object of the invention, accordingly, is to provide a new and improved method of and stud bolt structure for inherently pre-setting, calibrating and controlling the tightening tension of stud bolt assemblies, employing the splined tip, torque-off groove technique, that insures constant and automatic desired tightening by installers and without intervention or variation of tension by the installer, and particularly, though not exclusively, useful in channel assembly structures and the like.

A further object is to provide novel stud bolt assemblies, including for more general use, as well.

Other and further objects will be explained hereinafter and are more fully delineated in the appended claims.

SUMMARY

In summary, and from one of its important aspects, the invention embraces a stud bolt with calibrated tightening tension control comprising a threaded shank of predetermined diameter for threadedly securing a washer over an apertured position-clamping plate to a conduit channel containing a spring-loaded nut disposed alined with said aperture at the bolt shank end received within the channel, the opposite end of the bolt shank being provided with a splined tip of lesser diameter than said predetermined diameter extending from a torque-off groove collar the diameter of which is adjusted to the desired tightening tension, and with one of a head or further nut carried by the bolt shank between said torque-off groove and said washer. Preferred and best mode designs and method of application are described.

DRAWINGS

The invention will now be explained in connection with the accompanying drawings in which FIGS. 1 and 2 are respectively side and top elevations of a stud bolt constructed in accordance with the invention;

FIGS. 3 and 4 are isometric views of successive steps in the positioning of a spring-loaded nut within a channel unit for ultimately receiving the stud bolt of FIGS. 1 and 2;

FIGS. 5 and 6 are similar views of a pair of right-angularly oriented (horizontal and vertical) channels about to be secured by the stud bolt and spring-loaded nut of FIGS. 1-4 with the aid of a right-angle clamping or joining plate or bracket, respectively showing unassembled and assembled stages;

FIGS. 7 and 8 are isometric views similar to FIGS. 5 and 6, illustrating the bolt tensioning and the completely tightened and spline-sheared stages;

Figure 4:
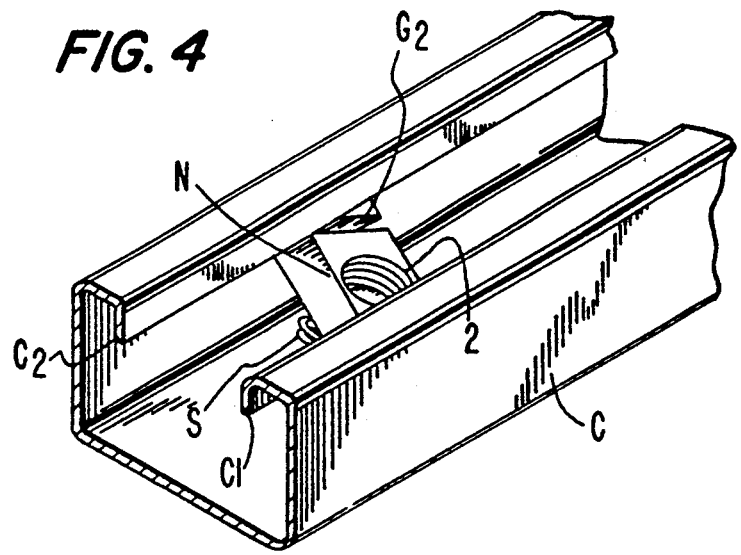
Figure 5:
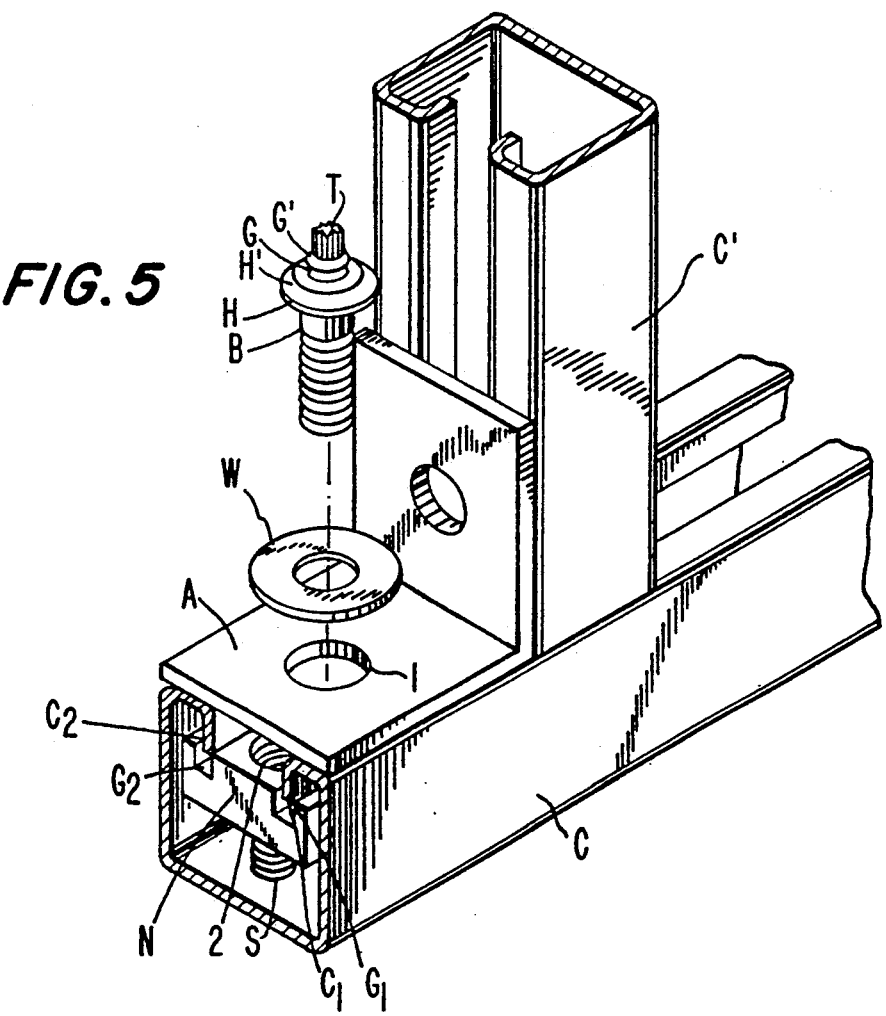
Figure 8:
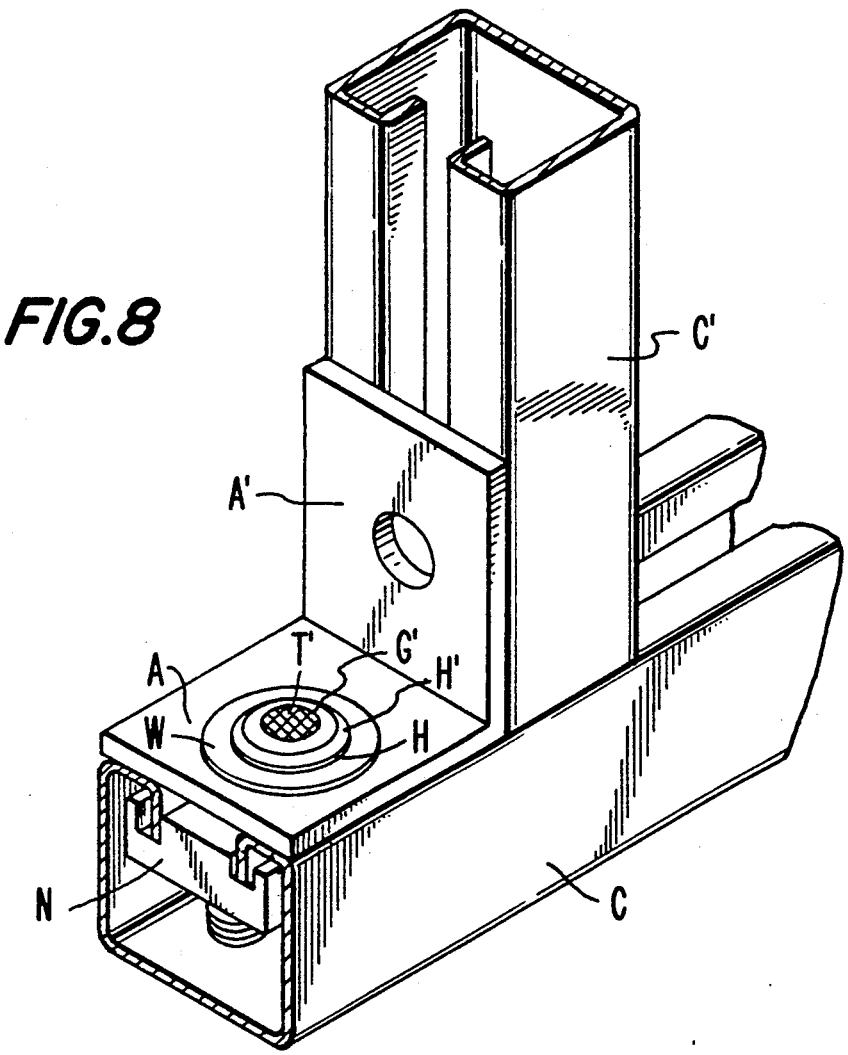
Figure 9:
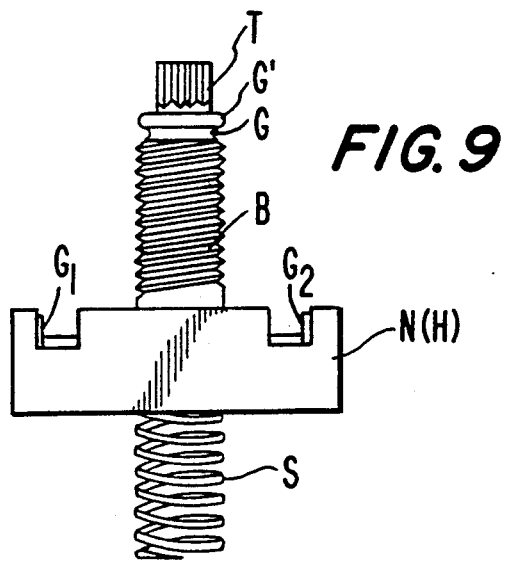
FIG. 9 is a side elevational view similar to FIG. 1 of a simplified combined stud bolt and spring-loaded nut assembly, representing a preferred form of the invention.
Figure 10:
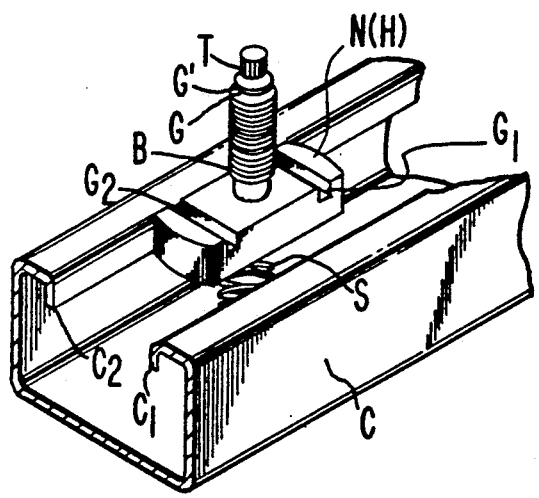
FIGS. 10 and 11 are respectively similar to FIGS. 3 and 4 but illustrating the positioning of the assembly of FIG. 9.
Figure 11:
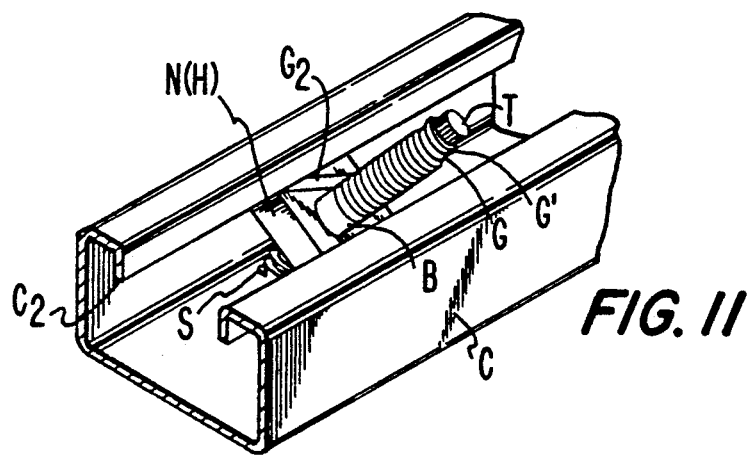

FIGS. 12 and 13 are respectively similar to FIGS. 5 and 6, but showing the assembling of the structure of FIG. 9; and FIGS. 14 and 15 are respectively similar to FIGS. 7 and 8, again, however, in connection with the stud bolt - spring-loaded nut assembly of FIG. 9.

DESCRIPTION

Referring to FIGS. 1 and 2, the threaded shank of a stud bolt is shown at B having an integral round head H of greater diameter, tapering upwardly and inwardly at H' and merging into an integral torque-off circumferential recessed groove G (shown preferably of lesser diameter than the bolt B) having an upper collar G', in turn merging into a splined or fluted cylindrical tip T of somewhat lesser diameter still. The torque-off groove G—G' is the location above which the bolt is tightened, as by a one-way ratchet wrench WR (FIG. 7) sliding over and engaging and rotating the bolt by the splined tip cylinder T to thread the bolt into the spring-loaded nut N, shortly to be described in connection with FIGS. 3-8. This is the weakest part of the bolt, designed as later explained, to break or shear off (FIG. 8). At a particular, and hereinafter-described inherently preset or calibrated degree of tightness or tensioning by the wrench WR, the force required for the installer to turn the bolt further into the nut will be greater than that required to twist off the tip T, such that the tip will break or shear off at the torque-off groove G—G'. After the spline tip has thus broken off, the bolt is tamper-proof since the installer no longer has a way to grab the head H of the bolt, since it is round.

Turning now to the details of the nut N (FIG. 3) into which the bolt B is threaded, the nut is of elongated configuration, having its central threaded aperture 2 that receives the threaded shank of the bolt B flanked by a pair of transverse grooves $G_1$ and $G_2$. The beforementioned conduit section C that receives the nut, shown horizontally oriented, is provided with longitudinally extending edge lips turned downwardly in somewhat J-fashion at $C_1$ and $C_2$. Depending from the bottom surface of the nut N is a spring S. By pressing down on the nut to compress the spring S, and rotating the nut 90° from its parallel conduit position of FIG. 3 to its transverse position of FIG. 4, and releasing the spring, the grooves $G_1$ and $G_2$ will snap up into engagement with the conduit lips $C_1$ and $C_2$ to hold the nut locked within the conduit and against rotation as the stud bolt B is threaded therein.

The system is now ready for installation as shown in FIGS. 5 and 6 in connection with the illustrative application to a right-angle conduit junction (horizontal conduit unit C and vertical conduit unit C'). This is effected with the aid of a position-clamping plate, shown in right-angle bracket form at A, having apertures or openings 1 for passing the bolt B therethrough and into engagement with the threaded aperture 2 of the nut N, which will be positioned in-line under the bracket plate opening 1 with a washer W positioned on top thereof, as shown in FIGS. 5 and 6. As before explained, the tightening of the bolt by engagement of a ratchet wrench WR with the stud bolt spline tip T and rotation, results in the tightened and joined condition of FIG. 8, with the tip T sheared off at the preset tightening tension. This operation, moreover, permits 100% external visual inspection of the tightening—i.e., tip T gone at T', FIG. 8, and as distinguished from earlier different uses as described, for example, in the above-described catalogue, where the grooves are at the end of the thread and not at the head with the tip, and where operation with one-way ratchets is not achievable. This process with a second bolt-nut assembly will, of course, be repeated at the vertical leg of the bracket A in the vertical conduit unit C' to complete the juncture.

As before explained, a significant advantage of this technique resides in taking all of the responsibility out of the hands of the installer, the worker, who has absolutely no control over what the tighteness of the bolt is going to be. Whatever preset or calibrated tightening tension of the bolt is desired—1000 lbs., 2000 lbs., etc.—this can all be adjusted and controlled by controlling the diameter of the torque-off groove G. Fine control and variation can further be obtained by use of a special lubricant, a light lubricant, on the threads of the bolt so as to maintain a desired relatively constant friction coefficient between the threads of the nut and bolt. Since radial force on the spline tip of the bolt is used to tighten it, a predetermined torque tension relationship is required. The maintenance of a preset and constant friction coefficient between the threads of the nut and bolt is essential. If, for example, a very high coefficient of friction was present, torque would be developed faster than tension. If, on the other hand, a very low coefficient of friction was present, tension would be developed faster than torque. To give an example of extremes, if the threads were not the same type of threads on the bolt and nut, binding would result, developing torque very rapidly and breaking the tip of the bolt off before any substantial tension could be applied. At the other extreme, if a lubricant were used that substantially eliminated friction, the bolt could literally be tightened by finger, and the bolt could actually break off altogether before the spline tip because of the absence of resistance.

In accordance with the present invention, predetermined tightening control is tailored to the customer, the end user—depending upon the thickness or the size of the channel, or the particular application, requiring more or less tension. As before indicated, there are two significant ways for controlling the preset tension. First, decreasing the size of the groove G so that the torque-off groove tip will break off earlier, or increasing the diameter so that it will take a greater force to break it off; and secondly, varying the lubricant employed—the greater the lubricity, the greater the reduction in the friction. The preferred technique is to control the diameter of the torque-off groove, employing only one lubricant so as to provide only a single variable, and in this manner, attaining very effective calibration of the tension or the amount of tightening. Where such groove diameter control is used, it is important, furthermore, to heat treat the bolts so that all the bolts have the same hardness.

As previously indicated, a preferred stud bolt-spring nut assembly is shown in FIGS. 9-15, wherein the spring nut and bolt are formed in a unitary structure, as by cold forming, with the function of the head of the bolt served by the nut body in a single-piece construction. Thus, in the embodiment of FIG. 9 the stud bolt B is shown integrally formed below the thread screws with the body of the nut N(H), with its transverse grooves $G_1$ and $G_2$ and depending spring S. Analogously to FIGS. 3-6, the nut body N(H), this time carrying the upwardly integral bolt B is fitted into the conduit C (FIGS. 10 and 11) and assembled with the angle bracket plate A and conduit units C and C' and washer W—but this time with a further hex nut N' threaded over the top of the bolt against the washer, and wrench tightened in slightly different fashion, later explained (FIG. 14), to spline tip torque-off (FIG. 15) as earlier described. In this embodiment, the spline tip T, instead of being on the bolt head H as in FIG. 1, is now at the end (upper) of the bolt threads, with the nut N(H) serving as the bolt head. With this construction tightening the spline tip T would not engage the tightening hex nut N'. So, a planetary type wrench gear WR is employed of well-known type, the inner spring-loaded socket of which holds the tip T, while the outer socket engages the hex nut N', permitting it to be tightened down on the bolt threads and against the washer W and bracket A. Such a wrench thus permits either turning the tip counterclockwise or turning the nut in a clockwise direction. With this planetary gearing, whichever has the least amount of resistance is going to turn. Initially, in tightening up, the nut is tightened because there is less resistance until the point is reached where it takes a greater force to turn the nut N' than it does to twist off the spline tip T of the bolt. At that point, the inner socket will turn and twist the tip T off the bolt B at the preset tension. Again, simple external visual inspection at T', FIG. 15, assures that all has been tightened correctly.

With heat-treated medium carbon steel stud bolts of about 12 mm. diameter and with a 25 mm. length threaded portion having 11-12 threads per inch, preset calibrated shearing of the spline tip T has been achieved at 4 tons with a groove G of about 9 mm.

Further modifications will occur to those skilled in this art and such are considered to fall within the spirit and scope of the invention as defined in the appended claims.

What is claimed is:

1. A stud bolt with calibrated tightening tension control comprising a threaded shank of predetermined diameter integrally carrying at its upper end a torque-off groove collar of reduced diameter from which extends an integral splined tip of lesser diameter than said predetermined diameter, the lower end of the threaded shank integrally carrying a bolt head which has an attached loading spring projection from a bottom surface thereof and which is receivable within an open conduit channel, with the bolt head being provided with grooves for receiving edges of lips of the channel, and with the diameter of the torque-off groove collar being adjusted to predetermine the degree of tightening tension applicable to the splined tip.

2. A stud bolt as claimed in claim 1 and in which a nut is threaded upon the upper end of the threaded shank with a position-securing apertured plate interposed between the nut and the conduit channel and with a washer disposed between the nut and the plate, such that, following tightening the nut upon the threaded shank, the splined tip is tightened about said groove-collar, shearing off the same.

* * * * *